United States Patent [19]
Koltookian et al.

[11] Patent Number: 5,442,854
[45] Date of Patent: Aug. 22, 1995

[54] PROCESS AND APPARATUS FOR ASSEMBLING MULTIPLE ROLLING BEARING AND A ROTATING MEMBER ONTO A SHAFT

[75] Inventors: Sarkis A. Koltookian, Cedar Falls; Michael E. Roby, Waterloo, both of Iowa

[73] Assignee: Deere & Company, Moline, Ill.

[21] Appl. No.: 348,623

[22] Filed: Dec. 2, 1994

[51] Int. Cl.$^6$ ............................................. B23P 11/00
[52] U.S. Cl. .............................. 29/898.07; 29/893.2; 29/434; 29/464; 29/525; 29/724; 29/244; 29/281.5
[58] Field of Search ............... 29/724, 898.07, 244, 29/252, 893.1, 893.2, 281.5, 282, 434, 464, 467, 525

[56] References Cited

U.S. PATENT DOCUMENTS

| | | | |
|---|---|---|---|
| 1,748,973 | 3/1930 | Buckwalter | 29/724 |
| 2,762,112 | 9/1956 | Kylen | 29/252 |
| 2,852,838 | 9/1958 | Krutmeijer | 29/252 |
| 3,191,259 | 6/1965 | Dalton | 29/252 |
| 3,830,633 | 8/1974 | Harbottle | 29/724 |
| 3,942,234 | 3/1976 | Kepler | 29/724 |
| 4,472,869 | 9/1984 | Yasui et al. | 29/252 |
| 4,587,715 | 5/1986 | Hallerbäck | 29/525 |
| 5,402,560 | 4/1995 | Rode | 29/282 |

FOREIGN PATENT DOCUMENTS

| | | | |
|---|---|---|---|
| 22673 | 3/1978 | Japan | 29/525 |
| 156943 | 12/1979 | Japan | 29/525 |
| 300831 | 12/1988 | Japan | 29/252 |

OTHER PUBLICATIONS
Shop Manual for Timken Roller Bearings, pp. 46–52.

*Primary Examiner*—David P. Bryant

[57] ABSTRACT

Apparatus includes a pilot stud and a ram. The pilot stud is aligned with an end of a shaft. A rotating member is adapted to receive axially inner and outer rolling bearings and be supported by the rolling bearings for rotation with respect to the shaft. The rotating member has a spacer for maintaining a desired separation between the rolling bearings. The rolling bearings and the rotating member are mounted on the pilot stud. The ram has an abutment member that is adapted to engage the outer rolling bearing. The ram is aligned with and moved toward the shaft. Movement of the ram toward the shaft causes the abutment member to move the outer rolling bearing against the spacer and onto the shaft. Also, this movement of the ram toward the shaft causes the spacer to move the inner rolling bearing onto the shaft. So, a single stroke of the ram mounts the rolling bearings and the rotating member onto the shaft. Preferably, the inner and outer rolling bearings each include a cone, a cup, and a tapered roller set adapted to be positioned for rolling between the cone and the cup. The abutment member preferably includes a radially inner abutment for engaging the outer cone and a radially outer abutment for engaging the outer cup. The radially inner and outer abutments have different axial dimensions for maintaining a desired axial spacing between the outer cone and cup.

10 Claims, 1 Drawing Sheet

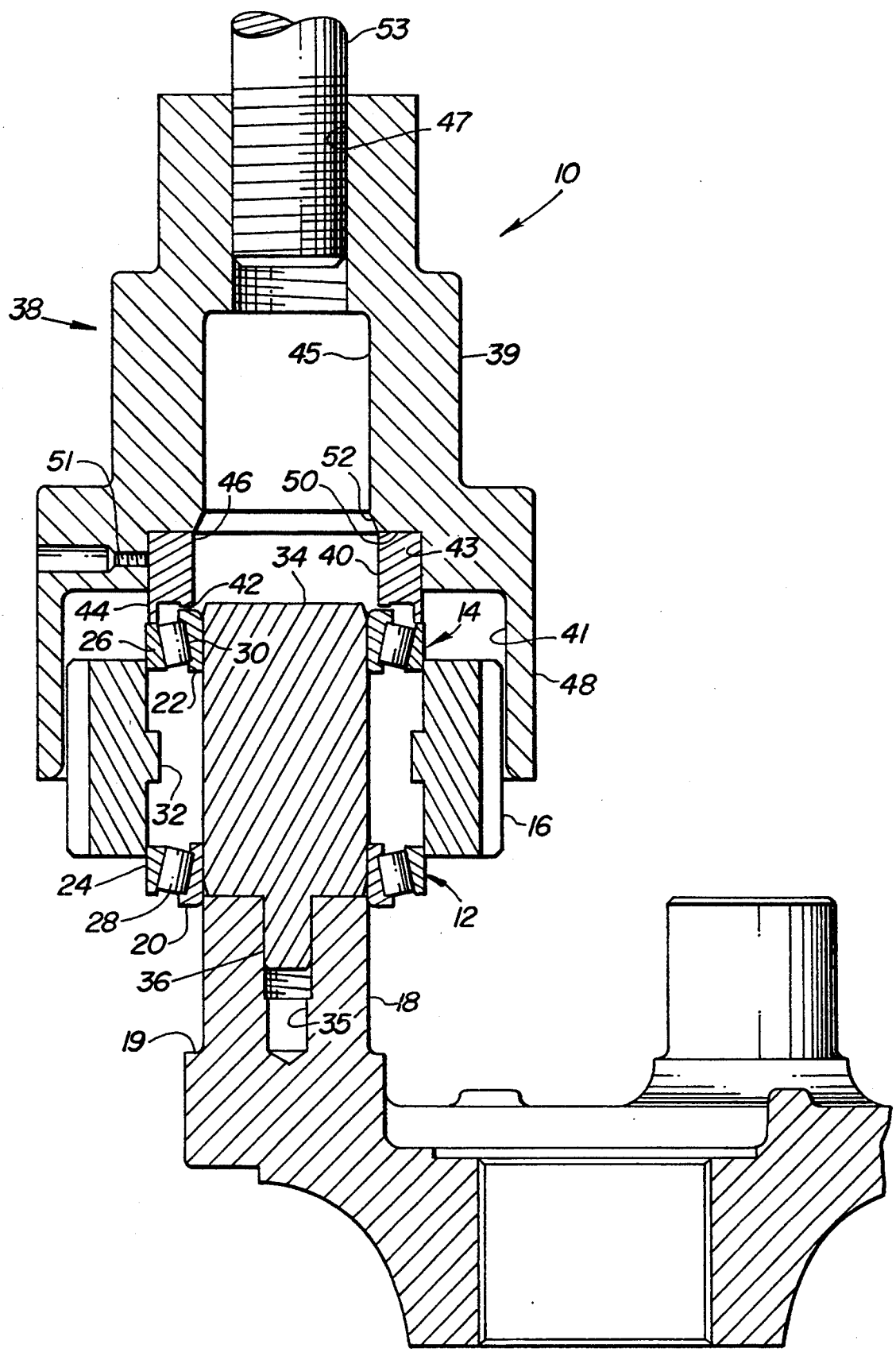

PROCESS AND APPARATUS FOR ASSEMBLING MULTIPLE ROLLING BEARING AND A ROTATING MEMBER ONTO A SHAFT

TECHNICAL FIELD

The invention relates generally to a process and an apparatus for assembling rolling bearings, and more particularly to a process and an apparatus for assembling multiple rolling bearings.

BACKGROUND ART

Rolling bearings usually are used to support a load between parts that rotate relative to each other. For example, rolling bearings regularly are positioned between a stationary shaft and a rotating member, such as a gear, pulley, sprocket, brake, or clutch or between a rotating shaft and a stationary member, such as a housing. For numerous applications the rolling bearings are press fit onto the shaft and into the rotating member. Also, for many applications, a certain degree of bearing pre-load is desirable. For example, when a mechanical device employing a rolling bearing is operated under a heavy load, a pre-load often is used in order to minimize the axial and radial end play clearances between the rolling elements and the inner and outer races. The pre-load reduces deflection of the bearing resulting from a load that is applied directly to the shaft or the rotating member. Furthermore, the pre-load improves the running conditions of a bearing that is operated under a dynamic load.

When double tapered roller bearings are press fit onto the shaft and into the rotating member, one cone and the cups typically are seated against shoulders or snap rings on the shaft and in the rotating member. The other cone remains movable so that an operator can make an axial adjustment to the other cone in order to set a pre-load for the bearings.

Presently, multiple ram strokes are used to install sets of double tapered roller bearings onto the posts of a planet pinion carrier of a planetary transmission. The standard procedure for installing planet pinions is basically as follows. A pilot stud is aligned with each post. The pilot studs have diameters slightly less than the diameters of the posts. Next, the following items are mounted on each pilot stud in the order listed: an inner bearing cone and roller set; an annular inner tool for moving the inner bearing cone and roller set; an inner bearing cup; a planet pinion that has a spacer for separating a set of double tapered roller bearings; an outer bearing cup; and an annular outer tool for moving the outer bearing cup. Each inner tool engages both the inner bearing cone and cup and has internal and external diameters that permit free movement on the pilot stud and in the planet pinion, respectively. Each outer tool engages its respective outer bearing cup and has internal and external diameters that permit free movement on the pilot stud and in the planet pinion, respectively.

The carrier then is aligned with rams that are moved through a first stroke into engagement with the outer tools and toward the posts. This movement forces the inner bearing cones and roller sets onto the posts and forces the cups into the planet pinions and against the spacers. Next, the planet pinions, including the pressed-in cups, plus the inner and outer tools are removed from the pilot studs.

The planet pinions with the pressed-in races are returned to the pilot studs and an outer bearing cone and roller set is mounted on each pilot stud. The carrier is realigned with the rams which are moved through a second stroke into engagement with the outer bearing cones, forcing the outer bearing cones and roller sets into the planet pinions and onto the posts. After withdrawal of the rams and removal of the pilot studs, the pre-load for each of the sets of double tapered roller bearings is set using washers and cap screws. The operator tightens the washers and cap screws in order to yield a preselected torque required for rotation of the planet pinions.

Shortcomings of multiple strokes include wasted assembly time, poor equipment utilization, and excess exposure of bearing parts to contaminants and damage.

SUMMARY OF THE INVENTION

One object of the invention is to reduce the number of strokes of a ram required for assembling multiple rolling bearings.

Another object is to allow assembling of multiple rolling bearings with a single stroke of a ram.

A further object of the invention is to provide for bearing end play clearances during assembling of multiple rolling bearings with a single stroke of a ram.

Still another object of the-present invention is to assemble multiple rolling bearings with a single stroke of a ram while driving the installation force through the rolling elements of only a single bearing.

According to the present invention, the foregoing and other objects and advantages are attained by providing an apparatus including a pilot stud and a ram. The pilot stud is aligned with an end of a shaft. A set of double rolling bearings and a rotating member are mounted on the pilot stud in the following order: inner bearing cone, roller elements, and cup, the rotating member, and outer bearing cup, roller elements, and cone. The rotating member is adapted to receive the axially inner and outer rolling bearings and has an internal spacer for maintaining a desired separation between the rolling bearings.

The ram has an abutment member that is adapted to engage the cone and cup of the outer rolling bearing. The ram is aligned with and moved toward the shaft. Movement of the ram toward the shaft causes the abutment member to engage the outer bearing and move the cone and the cup onto the shaft and into the rotating member against the spacer, respectively. So, a single stroke of the ram mounts the rolling bearings and the rotating member onto the shaft.

The ram abutment member preferably has inner and outer abutments that are spaced radially for engaging the outer cone and cup and dimensioned axially for maintaining a desired axial spacing between the outer cone and cup. Thus, after the bearings are press fit onto the shaft and into the rotating member, the bearing pre-load can be set in a conventional manner.

Additional objects, advantages, and novel features of the invention will become apparent to those skilled in the art upon examination of the following detailed description of a preferred embodiment of the invention when read in conjunction with the accompanying drawing.

BRIEF DESCRIPTION OF THE DRAWING

The FIGURE is a sectional view showing an apparatus constructed according to the present invention and showing a condition wherein the radially outer abutment of the ram is engaging the cup of the axially outer rolling bearing.

DETAILED DESCRIPTION OF THE PREFERRED EMBODIMENTS OF THE INVENTION

The FIGURE shows an apparatus 10 for assembling axially inner and outer rolling bearings 12, 14 and a rotating member 16 onto a shaft 18. In the drawing, the shaft 18 is illustrated as a post of a planet pinion carrier and the rotating member 16 is depicted as a planet pinion. As will be understood by those skilled in the art, the planet pinion carrier will be provided with a plurality of posts for carrying a plurality of planet pinions, but for the sake of simplicity only the one post and planet pinion are shown. The hollow cylindrical rotating member 16 is adapted to receive the rolling bearings 12, 14 and be supported by the rolling bearings 12, 14 for rotation with respect to the shaft 18.

The rolling bearings 12, 14 may be double tapered roller bearings that include respective inner and outer cones 20, 22, cups 24, 26, and tapered roller sets 28, 30 that are adapted to be positioned for rolling between the respective cones and cups 20, 24, 22, 26.

The shaft 18 includes a shoulder 19 against which the inner rolling bearing 12 is seated. The rotating member 16 includes a spacer 32 that is adapted to maintain a desired separation between the rolling bearings 12, 14. Preferably, the spacer 32 is formed integrally as an annular ridge that projects radially inward from an inner surface of the rotating member 16. Alternatively, the rotating member 16 may define a pair of interior annular grooves (not shown) and the spacer 32 may be formed as a pair of snap rings (not shown) positioned within the respective grooves.

The cones 20, 22, tapered roller sets, 28, 30, and cups 24, 26 are positioned in an arrangement commonly known as front-to-front opposition, as shown in the FIGURE, so that the peaks of the respective cones 20, 22 face each other in order to counteract the induced thrust resulting from the taper design of the rolling bearings 12, 14.

A pilot stud 34 is detachably coupled to and coaxially aligned with the shaft 18. The pilot stud 34 has a stud diameter that is less than a diameter of the shaft 18. Therefore, very little, if any, force is required to slide the rolling bearings 12, 14 over the pilot stud 34. A shaft bore 35 extends coaxially into the end of the shaft 18. A stub 36 projects coaxially from the pilot stud 34 and is adapted to be removably inserted into the shaft bore 35. Preferably, the stub 36 and the shaft bore 35 have mating screw threads. Alternatively, the major diameter of the stub 36 may be sized for slidable engagement with the minor diameter of the screw threads along the shaft bore 35.

A ram 38 is formed with a hollow, stepped cylindrical housing 39. Extending through the housing 39 is a stepped bore that preferably includes axially adjacent bores 41, 43, 45, 47, numbered in order of decreasing diameter size. The bore 41 is adapted to receive the rotating member 16. The bore 45 is adapted to slidably receive the pilot stud 34 and preferably includes a relatively brief tapered transition 52 at its opening from the bore 43. The bore 47 is threaded for receiving a threaded rod 53 that is part of a machine tool that effects movement of the ram 38 toward or away from the shaft 18.

Mounted in the bore 43 and abutting a radial wall 50 that extends between the bores 43 and 45 is a hollow cylindrical abutment member 40 that is adapted to engage the outer rolling bearing 14. Preferably, the abutment member 40 is formed as an insert 46 detachably mounted to the ram 38 by a set screw 51. Alternatively, the abutment member 40 may be formed integrally with the ram 38. In the preferred embodiment, the abutment member 40 includes an annular, radially inner abutment 42 projecting substantially parallel to the axis of the ram 38 for engaging the outer bearing cone 22 and an annular, radially outer abutment 44 projecting substantially parallel to the axis of the ram 38 for engaging the outer bearing cup 26. The radially inner and outer abutments 42, 44 have different axial dimensions for maintaining a desired axial spacing between the outer bearing cone and cup 22, 26. More specifically, the radially outer abutment 44 has a larger axial dimension than does the radially inner abutment 42 so that, during assembly, the outer bearing cup 26 is axially offset relative to the outer bearing cone 22. This axial spacing provides a desired looseness of the outer rolling bearing 14 so that after the press-fitting of the rolling bearings 12, 14 the operator can make an axial adjustment to the cone 22 in order to set the proper bearing pre-load or end play clearances. The different axial dimensions of the inner and outer abutments 42, 44 also ensure that the outer bearing roller set 30 is not subjected to a load during the press-fitting. In particular, the installation force is driven from the ram 38 through the outer abutment 44 to the cup 26 and through the inner abutment 42 to the cone 22.

In order to prepare for the assembling of the rolling bearings 12, 14 and the rotating member 16 onto the shaft 18, the rolling bearings 12, 14 and the rotating member 16 are mounted on the pilot stud 34. The ram 38 is aligned with and moved toward the shaft 18. Movement of the ram 38 toward the shaft 18 causes the abutment member 40 to engage the outer bearing 14 and force the cone 22 and the cup 26 onto the shaft 18 and into the rotating member 16 against the spacer 32, respectively. The movement of the ram 38 toward the shaft 18 also causes the spacer 32 to engage the inner bearing 12 and force the cone 20 and the cup 24 onto the shaft 18 against the shoulder 19 and into the rotating member 16 against the spacer 32, respectively. Thus, a single stroke of the ram 38 mounts the rolling bearings 12, 14 and the rotating member 16 onto the shaft 18.

In the preferred embodiment, the ram 38 includes a skirt portion 48 that defines the bore 41 and helps maintain the ram 38 and the rotating member 16 in alignment as the ram 38 is moved parallel to its axis toward the shaft 18. Also, the bore 45 helps align the ram 38 and the pilot stud 34 during the press-fitting.

Upon completion of the press-fitting of the rolling bearings 12, 14 and the rotating member 16 onto the shaft 18, the inner bearing cone 20 is seated against the shoulder 19, the inner bearing cup 24 is seated against the spacer 32, and the outer bearing cup 26 is seated against the spacer 32. After the complete installation of the rolling bearings 12, 14 and the rotating member 16, the ram 38 is withdrawn parallel to its axis and away from the shaft 18. At this point in the assembling, the outer bearing cone 22 is still axially displaced from its final position so that the operator can make the axial adjustment for setting the proper bearing end play clearances between the respective inner and outer cones and cups 20, 24, 22, 26.

The outer bearing cone 22 preferably is retained on the shaft 18 after the press-fitting, and the proper bearing pre-load or end play clearances are set, by a cap screw (not shown) extending through a washer (not shown) and into the shaft bore 35. The washer overlaps the outer bearing cone 22 and has a washer bore substantially coaxially aligned with the shaft bore 35. In any of various known ways, the operator uses the washer and cap screw to make the axial adjustment. For instance, the operator can tighten the washer and cap screw toward the shaft 18 until a preselected torque is required for rotation of the rotating member 16. Or, the operator can insert a selected shim pack (not shown) between the end of the shaft 18 and the washer.

From this disclosure showing and describing a specific embodiment of the invention, various obvious modifications of the invention will become apparent to those skilled in the art and can be made without departing from the spirit or scope of the invention. For example, one or more additional axially inner and outer rolling bearing sets easily could be assembled into separate rotating members and onto respective separate shafts. Moreover, the invention is described with respect to double tapered roller bearings, but easily could be used with other types of rolling bearings, including ball bearings.

Although, in the preferred embodiment, the pinion has been referred to as the rotating member 16 and the post has been considered as the stationary shaft 18, the invention has equal applicability where the bearings 12, 14 are set in a stationary housing and support a rotating shaft. Therefore, all references to rotating should be thought of in terms of relative movement and not necessarily in terms of absolute movement.

Because of the possible variations in the invention described above, the invention should not be limited to the detailed description or the specific illustrations, but only to the fair scope of the following claims.

What is claimed is:

1. Apparatus for assembling axially inner and outer rolling bearings and a rotating member onto a shaft, the rotating member adapted to receive the rolling bearings and be supported by the rolling bearings for rotation with respect to the shaft, the rotating member having a spacer adapted to maintain a desired separation between the rolling bearings, the apparatus comprising:
   a pilot stud coaxially aligned with an end of the shaft and having a stud diameter less than a diameter of the shaft, the rolling bearings and the rotating member being mounted on the pilot stud; and
   a ram aligned with the shaft and having an abutment member adapted to engage the outer rolling bearing, movement of the ram toward the shaft causing the abutment member to move the outer rolling bearing against the spacer and onto the shaft, and the movement of the ram toward the shaft causing the spacer to move the inner rolling bearing onto the shaft so that a single stroke of the ram mounts the rolling bearings and the rotating member onto the shaft.

2. The apparatus of claim 1, wherein:
   the inner and outer rolling bearings comprise respective cones, cups, and tapered roller sets adapted to be positioned for rolling therebetween; and
   the abutment member comprises a radially inner abutment adapted to engage the outer bearing cone and a radially outer abutment adapted to engage the outer bearing cup, the radially inner and outer abutments having different axial dimensions for maintaining a desired axial spacing between the outer bearing cone and cup.

3. The apparatus of claim 1, wherein:
   the abutment member is detachably mounted to the ram.

4. The apparatus of claim 1, wherein:
   the ram includes a skirt portion adapted to receive the rotating member.

5. The apparatus of claim 1, wherein:
   the ram defines a bore adapted to receive the pilot stud.

6. The apparatus of claim 1, wherein:
   the pilot stud is detachably coupled to the end of the shaft.

7. The apparatus of claim 1, wherein:
   a shaft bore extends into the end of the shaft; and
   a stub projects from the pilot stud and is adapted to be removably inserted into the shaft bore.

8. A process for assembling axially inner and outer rolling bearings and a rotating member onto a shaft, the rotating member adapted to receive the rolling bearings and be supported by the rolling bearings for rotation with respect to the shaft, the rotating member having a spacer adapted to maintain a desired separation between the rolling bearings, the process comprising the steps of:
   aligning a pilot stud with an end of the shaft;
   mounting the rolling bearings and the rotating member on the pilot stud;
   aligning a ram with the shaft, the ram having an abutment member adapted to engage the outer rolling bearing; and
   moving the ram toward the shaft in order to cause the abutment member to move the outer rolling bearing against the spacer and onto the shaft, and to cause the spacer to move the inner rolling bearing onto the shaft so that a single stroke of the ram mounts the rolling bearings and the rotating member onto the shaft.

9. The process of claim 8, wherein:
   the inner and outer rolling bearings comprise respective cones, cups, and tapered roller sets adapted to be positioned for rolling therebetween; and
   further comprising the step of maintaining a desired axial spacing between the outer cone and cup.

10. The process of claim 8, further comprising:
    the step of detachably coupling the pilot stud to the end of the shaft.

* * * * *